US009820190B2

(12) United States Patent
Bengtsson et al.

(10) Patent No.: US 9,820,190 B2
(45) Date of Patent: Nov. 14, 2017

(54) METHOD FOR OPERATING A BASE STATION IN A WIRELESS RADIO NETWORK AND CORRESPONDING BASE STATION

(71) Applicant: Sony Mobile Communications, Inc., Tokyo (JP)

(72) Inventors: Erik Bengtsson, Eslöv (SE); Vanja Plicanic Samuelsson, Lund (SE)

(73) Assignee: Sony Mobile Communications, Inc., Tokyo (JP)

( * ) Notice: Subject to any disclaimer, the term of this patent is extended or adjusted under 35 U.S.C. 154(b) by 0 days.

(21) Appl. No.: 14/418,817

(22) PCT Filed: Mar. 28, 2014

(86) PCT No.: PCT/IB2014/060252
§ 371 (c)(1),
(2) Date: Jan. 30, 2015

(87) PCT Pub. No.: WO2015/114413
PCT Pub. Date: Aug. 6, 2015

(65) Prior Publication Data
US 2016/0329941 A1    Nov. 10, 2016

(30) Foreign Application Priority Data
Jan. 30, 2014  (EP) ................................... 14153322

(51) Int. Cl.
*H04W 28/12*  (2009.01)
*H04B 7/0456*  (2017.01)
(Continued)

(52) U.S. Cl.
CPC .......... *H04W 28/12* (2013.01); *H04B 7/0452* (2013.01); *H04B 7/0456* (2013.01);
(Continued)

(58) Field of Classification Search
CPC .. H04B 7/0456; H04B 7/0874; H04L 25/0226
See application file for complete search history.

(56) References Cited

U.S. PATENT DOCUMENTS

| 8,797,212 B1* | 8/2014 | Wu ...................... H01Q 3/2605 342/368 |
| 2007/0263745 A1* | 11/2007 | Hayase ................ H04B 7/0615 375/267 |
| 2008/0205540 A1* | 8/2008 | Takeda .................... H04B 7/04 375/267 |

(Continued)

OTHER PUBLICATIONS

International Search Report of PCT/IB2014/060252 dated Sep. 30, 2014.

*Primary Examiner* — Freshteh N Aghdam
(74) *Attorney, Agent, or Firm* — Wolf, Greenfield & Sacks, P.C.

(57) ABSTRACT

Method for operating a base station in a wireless radio network and base station A base station (11) for a wireless radio network (10) comprises a plurality of antennas (12) for transmitting radio frequency signals between the base station (11) and a user equipment (16). The base station (11) receives at each antenna (12) of a subset of the plurality of antennas (12) training signals sent by the user equipment (16) and determines an antenna configuration parameter for each antenna (12) of the subset of the plurality of antennas (12) based on a combination (60-62) of the training signals received in a plurality of different frames (20) at the corresponding antenna (12) for a subsequent transmission of payload information (22, 23) between the base station (11) and the user equipment (16). The combination of the training signals of the different frames may include an averaging and/or a weighting of the training signals.

15 Claims, 2 Drawing Sheets

(51) Int. Cl.
*H04B 7/08* (2006.01)
*H04L 25/02* (2006.01)
*H04B 17/318* (2015.01)
*H04B 17/336* (2015.01)
*H04B 7/0452* (2017.01)
*H04W 4/02* (2009.01)
*H04W 72/04* (2009.01)

(52) U.S. Cl.
CPC ......... *H04B 7/0874* (2013.01); *H04B 17/318* (2015.01); *H04B 17/336* (2015.01); *H04L 25/0204* (2013.01); *H04L 25/0222* (2013.01); *H04L 25/0226* (2013.01); *H04W 4/02* (2013.01); *H04W 4/026* (2013.01); *H04W 4/027* (2013.01); *H04W 4/028* (2013.01); *H04W 72/0446* (2013.01)

(56) References Cited

U.S. PATENT DOCUMENTS

| | | | | |
|---|---|---|---|---|
| 2009/0054093 A1* | 2/2009 | Kim | ............ | H04B 7/061 455/500 |
| 2009/0141841 A1* | 6/2009 | Dateki | ............ | H04L 5/0007 375/346 |
| 2009/0247229 A1 | 10/2009 | Teo et al. | | |
| 2011/0294529 A1* | 12/2011 | Luo | ............ | H04L 5/0048 455/509 |
| 2015/0124909 A1* | 5/2015 | Sahara | ............ | H04L 25/0204 375/340 |
| 2016/0021551 A1* | 1/2016 | Park | ............ | H04B 7/0619 370/328 |

\* cited by examiner

[Fig. 1]
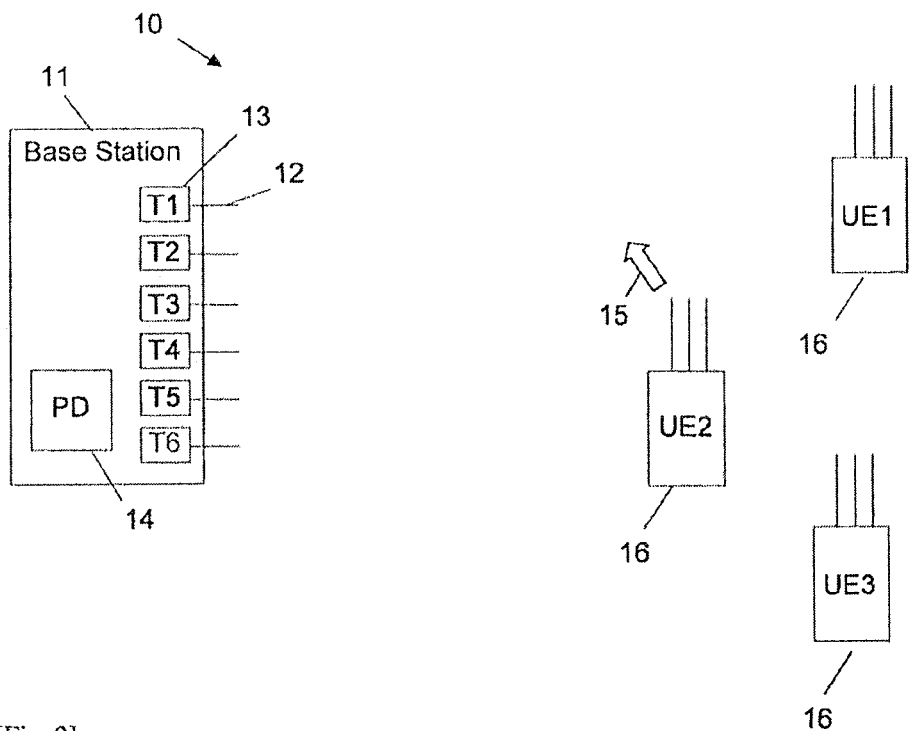
[Fig. 2]
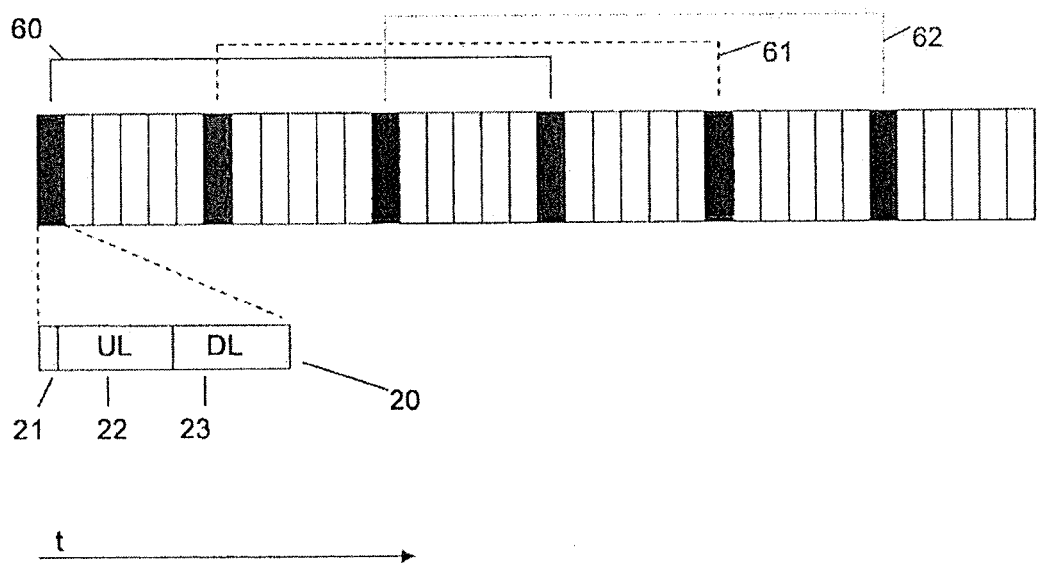

[Fig. 3]
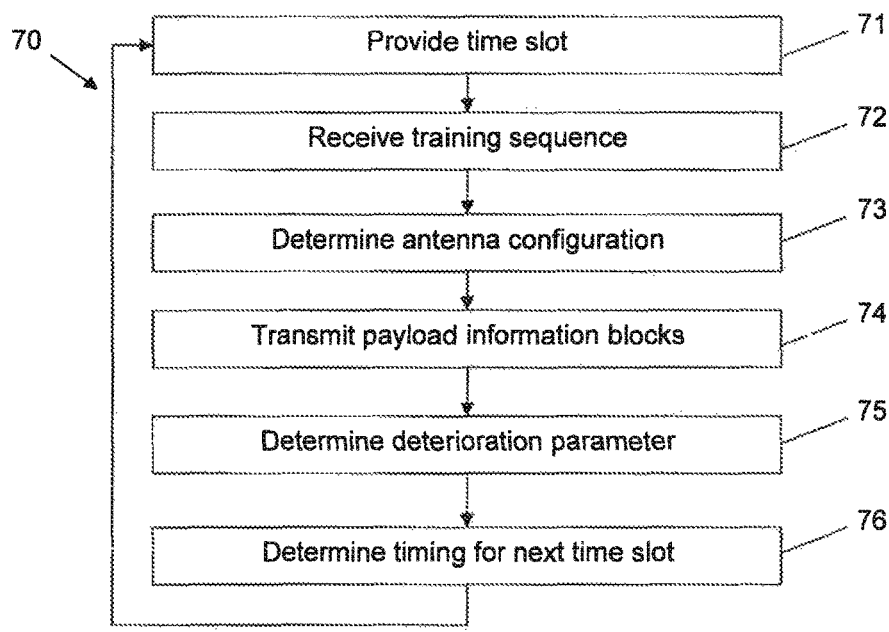
[Fig. 4]
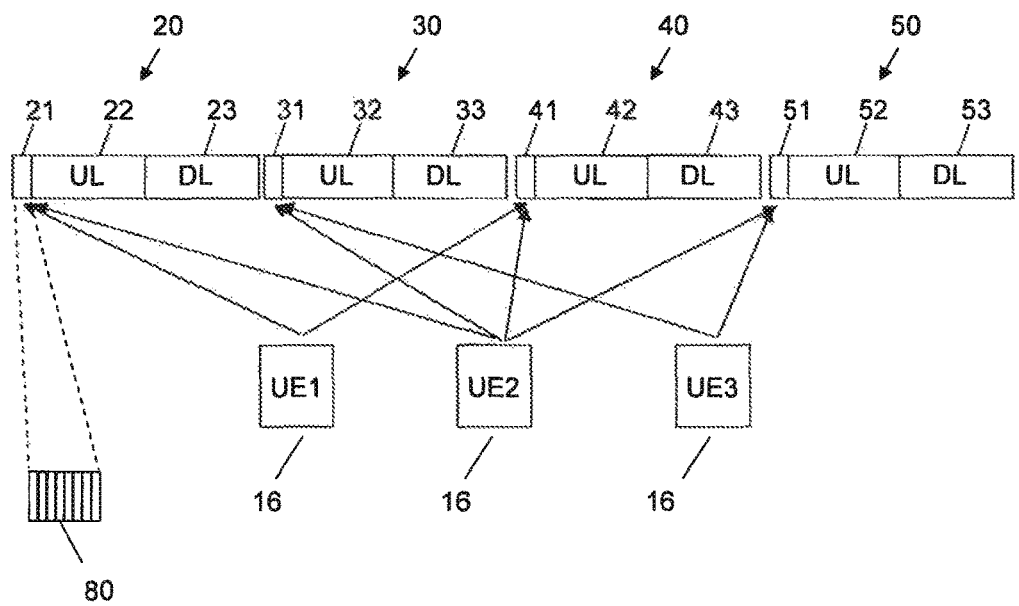

METHOD FOR OPERATING A BASE STATION IN A WIRELESS RADIO NETWORK AND CORRESPONDING BASE STATION

CROSS-REFERENCE TO RELATED APPLICATIONS

This application is the national phase under 35 U.S.C. §371 of PCT International Application No. PCT/IB2014/060252, filed Mar. 28, 2014, which claims the benefit of European Patent Application No. 14 153 322.4, filed Jan. 30, 2014, the entire contents of the aforementioned applications are hereby incorporated herein by reference.

TECHNICAL FIELD

The present invention relates to a method for operating a base station in a wireless radio network. Especially, the present invention relates to a method for operating a base station comprising a plurality of antennas for transmitting radio frequency signals according to a so-called multiple-input and multiple-output (MIMO) technology. The present invention relates furthermore to a base station which implements the method, and a user equipment which is configured to be used in connection with the base station.

BACKGROUND ART

For increasing data transmission performance and reliability, the so-called multiple input and multiple-output technology (MIMO) may be used in wireless radio frequency telecommunications for transmitting information between a base station and a user equipment. The MIMO technology relates to the use of multiple send and receive antennas for a wireless communication at for example a base station or a user equipment. The MIMO technology forms the basis for coding methods which do not only use the temporal dimension but also the spatial dimension for transmitting information and, therefore, enables a space and time coding. Thus, the quality and data rate of the wireless communication may be increased.

When a large number of user equipments is arranged within a cell served by a base station having a plurality of antennas and transmitting information according to the above-described MIMO technology, such an arrangement is called a massive MIMO system. In such a massive MIMO system, the configuration of the individual antenna transceivers of the base station may vary depending on the location of each of the user equipments and transmission conditions in an environment of the base station and the user equipment.

A massive MIMO system may be used in connection with a time division duplex (TDD) system in which a transmission of an information stream between the base station and a user equipment is split up into time slots embedded in a frame structure. Different time slots for uplink (UL) data communications and downlink (DL) data communications may be provided for communicating information from the user equipment to the base station (uplink) and for communicating information from the base station to the user equipment (downlink). In such a massive MIMO system, there is a need for an additional time slot which may be called a "header" for transmitting a pilot signal or a training signal including a training sequence from the user equipment to the base station. Based on the received pilot signal, which is also called "footprint" of the user equipment, the base station may configure the transceivers of its antenna array according to spatial and environmental conditions. Thus, high antenna gain for the payload to be transmitted in the following time slots can be achieved. The payload may be transmitted in a number of uplink and downlink time slots. However, when the user equipment is moving, the channel quality may degrade due to a change of the spatial arrangement of the base station and the user equipment.

Typically, massive MIMO systems are expected in buildings such as offices, shopping malls and so on. In this environment a large number of user equipments is expected. The mobility of the user equipments or a changing spatial arrangement of the base station and the user equipments may demand that channel training sequences are sent frequently in order to keep up with the aging or erosion of the antenna configurations of the MIMO system. The faster a user equipment is moving, the more frequently a training sequence needs to be transmitted from each user equipment to the base station. Typically, the base stations in such a massive MIMO system are configured in a way to allow a maximum speed or spatial arrangement change of the user equipments. However, this may have an impact on the system throughput as the frequently sent training sequences may occupy a valuable and significant part of the data communication channel.

For a typical user connected to a MIMO system it is likely that the pilot signal transmission intensity is proportional to the velocity of the user. In addition, the higher the number of users that are moving, the less there are pilots available, and hence less numbers of users can be supported by the system. A problem that may arise in such an implementation is when the user is not moving but is using the mobile device for example for browsing and/or in a talk mode. The user is stationary, but the corresponding mobile device is not as a mobile device in the hands of a user is always randomly moved within a limited space nearby the user. The mobile device's position and orientation may change a little back and forth as the user is tapping on the display of the mobile device or when user is showing something to a friend. An impact of this constantly present, random movement is that, to maintain good connection, the pilot information needs to be sent very often, so that the system may be overloaded with pilot information more than needed.

Therefore, it is the object of the invention to provide an improved method of operating abuse station in a MIMO system as well as a corresponding base station, which allow to avoid or at least reduce an overload of the system due to excessive pilot or training signal transmissions caused by movements of a user equipment in the system, especially by small movements within a limited space near the respective user.

SUMMARY

According to the present invention, this object is achieved by a method for operating abase station in a wireless radio network as defined in claim 1 and a base station as defined in claim 12. Furthermore, the invention also provides a user equipment that is configured for operation with the base station as defined in claim 15. The dependent claims define preferred or advantageous embodiments of the invention.

According to an embodiment of the invention, a method for operating a base station in a wireless radio network is provided, the base station comprising a plurality of antennas for transmitting information in a frame structure between the base station and a user equipment. The base station receives at each antenna of a subset of the plurality of antennas training signals or pilot signals sent by the user equipment and determines an antenna configuration parameter for one or more frames or a part thereof for each antenna of the subset of the plurality of antennas based on a combination of the training signals received in a plurality of different frames at the corresponding antenna for a subsequent transmission of payload information between the base station and the user equipment using the determined antenna configuration parameter for the corresponding antenna.

The term "base station" as used herein may relate to any type of a cellular or non-cellular access node of a wireless radio network, so that the term "base station" for example may refer to a base station of a cellular communication network or to an access point of a wireless local area (WLAN) for the transmission of information with corresponding user equipments. Furthermore, the term "base station" may also refer to the base station side in general of a communication system in which the antennas of the base station side are distributed, so that the invention may also be applied to so-called cooperative MIMO systems or distributed antenna systems. The term "transmit", "transmission", etc., as used in the present description covers both receiving information from the user equipment at the base station and sending information from the base station to the user equipment. Furthermore, the term "antenna configuration parameter" is to be understood to cover both an analog configuration and a digital configuration of the respective antenna. In an embodiment of the invention, all antenna configuration is made in the digital domain, so that the antennas may be passive and are fed with signals having an amplitude and/or a phase determined from the above combination of the training signals of the different frames and the correspondingly calculated footprint matrix.

According to a further embodiment of the invention, the antenna configuration parameter may be obtained by timewise averaging and/or weighting the individual training signals received in the different frames. In the latter case, weighting factors used for the weighting of the individual training signals may be chosen such that the training signal of the most recently received frame is weighted higher than a training signal of a frame that has been received earlier than the most recently received frame. Alternatively or additionally, the weighting factors may be chosen such that a training signal is weighted higher the later the frame of this training signal has been received at the corresponding antenna of the base station.

In general, it may be preferable to weight the recently received training signals higher than earlier received training signals. The weighting functions used for the weighting of the training signals can be based on an observation of monotonous or similar patterns in the training sequences received from a user equipment, so that the weighting can be continuously adapted accordingly and can be optimized for those training sequences which include more changes.

For the combination of the individual training signals of the different frames, a sliding window technology may be used which leads to a new combination of the training signals once a new training signal is received from the user equipment. For example, the sliding window may be such that, for the determination of the antenna configuration parameter, it considers at least the training signal of that frame in which most recently a training signal has been received from the user equipment and the training signal of at least one earlier received frame, so that the sliding window is continuously adapted and moved along the frames received from the user equipment. According to an embodiment, with each new sliding window a new training signal is considered and an old training signal is discarded.

The invention may preferably be applied to the communication between the base station and a user equipment for which a movement has been determined between the base station and the user equipment. More preferably, the invention may be applied to the communication between the base station and a user equipment for which it has been determined that the user equipment, on the big scale, is stationary, which means that the respective user is stationary, but for which nevertheless some degree of movement is present between the base station and the user equipment, for example if the user uses the user equipment for browsing or is showing something on the user equipment to a friend. Such a recognition can be done with known conventional technologies or algorithms both at the base station and at the user equipment, e.g., by using accelerometers, positioning technologies and/or tracking technologies, etc. For example, a moving user equipment of a stationary user may be indicated if the average speed of the user equipment is below a given threshold value, while the accelerometer of the user equipment indicates a movement of the user equipment. Furthermore, a moving user equipment of a stationary user could also be determined by analysis of the footprint.

The invention allows to use a combination of multiple pilots and corresponding footprints, for example a time average and/or a weighted combination of multiple footprints, for the determination or calculation of the antenna configuration at a base station in a MIMO system, especially in a massive MIMO system, which enables a larger coverage and a slower pilot rate. Especially small movements of a user equipment may thus be filtered.

Since the usage of mobile devices like smartphone is never absolutely stationary, even if the user is stationary, the corresponding communication channel between the base station and the mobile device will likewise never be absolutely stationary. Tom maintain a good connection quality and a reliable data transfer, such a random movement would normally require an intensive update of the pilots for the base station so as to be able to keep track of the mobile device's footprint. Such an excessive transmission of pilot or training signals can be avoided by the above proposed combination of the training signals of different frames. This results in a higher robustness with respect to small movements of the mobile device.

According to an embodiment of the invention, the above-proposed combination of the training signals received in different frames for the determination of the antenna configuration of the base station may be combined with a dynamic pilot allocation or utilization in order to free up resources, which means that a deterioration of the transmission between the base station and the corresponding user equipment is continuously monitored to determine the time of a next time slot for the receipt of a next training signal from the user equipment based on the deterioration of the transmission.

For example, the deterioration of the transmission between the base station and the user equipment may be determined based on a movement, preferably a relative movement) between the base station and the user equipment and/or based on a spatial information of the base station or of the user equipment.

The invention also provides a base station and a user equipment which is configured for carrying out the method described above, so that both the base station and the user equipment also include the above advantages and are preferably suitable for the use in MIMO communication systems.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF DRAWINGS

The present invention will be described in more detail with reference to the accompanying drawings.

FIG. 1 shows schematically a base station and user equipments according to an embodiment of the invention.

FIG. 2 illustrates a determination of an antenna configuration of the base station shown in FIG. 1 according to an embodiment of the invention.

FIG. 3 shows a flow chart depicting method steps for adapting a timing for controlling training signal time slots according to an embodiment of the invention.

FIG. 4 shows an assignment of time slots for transmitting training signals according to an embodiment of the invention.

DESCRIPTION OF EMBODIMENTS

In the following, exemplary embodiments of the present invention will be described in more detail. It is to be understood that the features of the various exemplary embodiments described herein may be combined with each other unless specifically noted otherwise. Same reference signs in various drawings refer to similar of identical components. Any coupling between components or devices shown in the figures may be a direct or an indirect coupling unless specifically noted otherwise.

FIG. 1 shows three user equipments 16 (UE1, UE2 and UE3) arranged in an environment 10 of a base station 11. The base station 11 comprises a plurality of antennas 12 and associated transceivers 13 (T1 . . . T6). In FIG. 1 only six antennas 12 and six transceivers 13 are shown for clarity reasons. However, these are only exemplary numbers, and the base station 11 may comprise for example an array of 30 to 100 or even more antennas 12 and associated transceivers 13 arranged for example in a matrix or cylindrically. Likewise, the user equipments 16 may each comprise one or more antennas. For example, each user equipment may comprise one to four antennas (the user equipments of FIG. 1 each have three antennas).

The base station 11 comprises furthermore a processing device (PD) 14 coupled to the transceivers 13 and adapted to configure the transceivers 13 for transmitting radio frequency signals between the base station 11 and the user equipments 16. The multiple antennas 12 and transceivers 13 of the base station 11 may be used and configured such that the above-described multiple-input and multiple-output (MIMO) technology may be utilized for transmissions between the base station 11 and the user equipments 16. The signal processing according to the MIMO technology may be performed in the analog or digital domain or a combination thereof. Therefore, for example, a part of the transceiver functionality may be implemented digitally, for example in a signal processor or in the processing device, and the antennas 12 and the remaining parts of the transceivers 13 may be passive components.

For determining configuration parameter sets for the transceivers 13 of the base station 11 which provide a high quality transmission taking into account spatial information of the individual user equipments 16 with respect to the base station 11, a radio frequency training signal or a pilot signal with a training sequence may be transmitted from each user equipment 16 to the base station 11 which is received and processed at each antenna of s subset of the plurality of antennas 12. The subset may include for each user equipment 16 one, two or more of the plurality of antennas 12. Based on the received training signal, corresponding configuration parameters for the transceivers 13 may be determined at the base station 11. However, when one of the user equipments is moving at least to some degree, for example the user equipment UE2 as indicated by arrow 15 in FIG. 1, the transmission quality will degrade unless the corresponding configuration parameters are updated for the new position. Furthermore, even when the user equipment is not moving, as for example the user equipments UE1 and UE3 in FIG. 1, due to changes in the environment, the transmission quality may degrade unless the corresponding configuration parameters are updated for the new environment.

An update may be performed by transmitting a further training signal and determining updated configuration parameters based on the training signals received at the base station 11. However, this limits the speed with which the user equipments are allowed to move or with which environmental changes are allowed to take place without degrading transmission performance. Reducing the interval between emitting the training signals from the user equipments 16 to the base station 11 may reduce overall system performance due to an increasing amount of data for the training signals.

This problem may also arise if the user of the user equipment is stationary, but the user equipment is moving, for example if the user is tapping on a display of the user equipment which may cause a change of the orientation of the user equipment, or if the user is showing the user equipment to a fried, etc.

In order to address this problem, the base station 11 may be configured to determine or calculate the antenna configuration parameters for its antennas 12 and transceivers 13 on the basis of a combination of the training signals received in a plurality of different frames, i.e., on the basis of a combination of the pilots received in at least two different frames. Such a combination may include a timewise averaging and/or a weighted combination of the individual training signals or pilots. In the case of averaging, the averaging process would usually require the calculation of the average of a multi-dimension matrix.

FIG. 2 shows an illustration of such an averaging mechanism according to an embodiment of the invention.

FIG. 2 shows a series of frames that may be transmitted one after the other between the user equipments 16 and the base station 11 (t indicates the time in FIG. 2). Each frame comprises a header 21 and a payload information field comprising an uplink (UL) payload information block 22 and a downlink (DL) payload information block 23. Furthermore, each header 21 comprises a plurality of time slots for receiving training signals from the user equipments 16. In FIG. 2, it is assumed that a specific user equipment send a pilot signal only in one of six subsequent frames, while the same user equipment does not transmit a training signal in the other five frames of this group of subsequent six frames. Those frames, in which the user equipment transmits a training signal, are marked black in FIG. 2, while the other frames, in which the user equipment does not transmit a training signal, are indicated as white blocks in FIG. 2. This, however, is only an exemplary example, and as a matter of course, it is also possible that the user equipment transmits a training signal in each frame 20 or in frames having a different constant or variable timewise spacing.

In the exemplary embodiment of FIG. 2, the base station 11 uses a sliding window for averaging the training signals, pilots or footprints of four training signals that received at the base station 11 in four different frames 20. For example, in FIG. 2, when receiving a new frame 20 with a training signal of one of the user equipments, the base station uses this training signal as well as the preceding three training signals received from this user equipment to calculate or determine the antenna configuration parameter for the corresponding antenna 12 and transceiver 13. This is indicated by the window 60 in FIG. 2.

As new training signals are received from the same user equipment, the base station 11 shifts the window such that an older training sequence is discarded, while the respective new training signal is considered for the calculation of the configuration parameter. This is indicated by windows 61 and 62 shown in FIG. 2, which are shifted with respect to window 60 by a group of six frames including one frame with a new training signal from the user equipment and a group of twelve frames including two frames with new training signals, respectively.

The bases station 11 calculates or determines the corresponding configuration parameters on the basis of a combination of the training signals from the respective user equipment which are covered by the window 60, 61 or 62. For example, the base station 11 may determine the configuration parameters by calculating a time averaged training sequence information from the corresponding training signals.

Alternatively or additionally, the base station 11 may also be configured such that it determines the configuration parameters by calculating a weighted training sequence information from the corresponding training signals, so that the individual training signals covered by the respective window 60-62 are weighted differently depending on when they have been received by the base station 11. In particular, the most recently received training signal may be weighted higher than the oldest or earliest received training signal by choosing corresponding individual weighting factors for each training signal.

The above-described approach may be combined with a dynamic header allocation mechanism which allocates time slots for the transmission of the training signals depending on the condition of the transmission channel between the base station 11 and the user equipments 16.

Less time slots, so-called "pilot channels", may be provided for each transmission frame than user equipments 16 are arranged within a cell served by the base station 11. Then, fast moving user equipments or user equipments in a changing environment may use a time slot in each frame, while stationary or slow moving user equipments may use time slots less often. The allocation scheme needs to provide synchronization between the user equipments 16 and the base station 11. For example, the base station may allocate an appropriate frequency for the time slots to each user equipment 16. By taking the mobility of the user equipments 16 and the environment into account, when allocating the time slots, the amount of header information may be reduced per frame. Therefore, the header size may be reduced, and the cell's payload capacity may be improved compared to a system where a training signal time slot is allocated lox each user equipment 16 in each frame 20. Another way of looking at it would be that for a fixed frame definition a larger number of user equipments may be connected.

FIG. 3 shows the above-summarized method in more detail. The method 70 shown in FIG. 3 comprises method steps 71 to 76. In step 71, a time slot is provided for receiving at each antenna 12 of the base station 11 a training signal sent from each of the user equipments 16 (step 72). In step 73, for each antenna a corresponding configuration parameter is determined based on the training signals received at the corresponding antenna 12 in conformity with the method described above. In step 74, payload information blocks are transmitted between the base station 11 and the user equipments 16 using the determined configuration parameters for the antennas 12. In step 75, a deterioration parameter of a transmission between the base station 11 and each of the user equipments 16 is determined.

The deterioration parameter may be determined based on spatial information of the base station 11 and each of the user equipments 16. For example, a movement between the base station 11 and each of the user equipments 16 may be determined. The spatial information may be derived from inherent configuration parameters indicating for example a stationary position of the base station 11 or the user equipment 16, or may be determined based on for example geographic information of a global positioning system. The spatial information may comprise furthermore a location, a speed, an acceleration and a moving direction. The corresponding spatial information of the user equipments 16 may be transmitted to the base station 11 in corresponding information protocol data units. Based on the spatial information of the base station 11 and each of the user equipments 16, the base station 11 may determine if a deterioration of the transmission between the base station 11 and the corresponding user equipment 16 may occur due to a position change, so that an adaption of the configuration parameters of the antennas 12 may be required to compensate for this.

Furthermore, for taking into account changes in its environment, the base station 11 may additionally monitor a bit error rate of each transmission to determine if an adaption of the configuration parameters of the antennas 12 is required to maintain a high quality data transmission. Further, the deterioration parameter may also be determined by a noise figure or a signal level of the transmission between the base station 11 and the user equipments 16. Additionally or as an alternative, the deterioration parameter may also be determined by detecting a change from frame to frame in a footprint matrix of each user equipment 16, which is a characteristic pattern in the antenna configuration parameters formed by the training signals from this user equipment.

Based on this deterioration parameters determined or estimated by the base station 11, for each user equipment 16 a timing for a further time slot or a time slot rate for receiving a next training signal is determined in step 76. Therefore, for slow moving or stationary user equipments preferably less time slots for receiving training signals are provided than for user equipments having a high mobility or user equipments arranged with respect to the base station 11 in a rapidly changing environment.

FIG. 4 shows in more detail an embodiment for providing or allocating the time slots for receiving the training signals. FIG. 4 shows a plurality of transmission frames 20, 30, 40 and 50. Each transmission frame comprises a header 21, 31, 41 and 51, respectively, and a payload information field comprising an uplink UL payload information block 22, 32, 42 and 52, respectively, and a downlink DL payload information block 23, 33, 43 and 53, respectively. As shown in more detail with respect to the header 21, each header comprises a plurality of time slots 80 for receiving training signals from the user equipments 16. In the example shown in FIG. 4, the header comprises eight time slots 80 without, of course, being restricted to this particular number of time slots.

In the example of FIG. 4, the user equipments UE1 and UE3 are stationary, whereas the user equipment UE2 is moving. Therefore, the moving user equipment UE2 transmits the training sequence in every frame as indicated by the arrows, whereas the stationary user equipments UE1 and UE3 transmit their training sequences in every other frame only. In detail, user equipment UE1 transmits its training sequences in transmission frames 20 and 40, and user equipment UE3 transmits its training sequences in transmission frames 30 and 50. Therefore, the header size may be reduced, and more payload information may be transmitted. Furthermore, the adaption of the configuration parameters within the base station 11 may be performed for the user equipments UE1 and UE3 less frequently which may reduce also the calculation intensity within the base station 11.

In general, the configuration parameters for the transmission of uplink information may be different from those for the transmission of downlink information.

The training signals need to be orthogonal in order for the base station 11 to identify the configuration parameters for the plurality of antennas 12 for each of the individual user equipments 16. In the above described exemplary embodiments, the training signals are separated by using different time slots according to a time division multiple access (TDMA) technology. However, orthogonality may also be achieved by other orthogonal access technologies like code division multiple access (CDMA) or frequency division multiple access (FDMA) technologies or a combination thereof.

The invention claimed is:

1. A method for operating a base station in a wireless radio network, wherein the base station comprises a plurality of antennas for transmitting information in a frame structure between the base station and a user equipment and wherein the user equipment transmits training signals to the base station,
the method comprising the steps:
  receiving at each antenna of a subset of the plurality of antennas of the base station the training signals sent by the user equipment, and
  determining an antenna configuration parameter for each antenna of the subset of the plurality of antennas based on a combination of the training signals received in a plurality of different frames at the corresponding antenna for a subsequent transmission of payload information between the base station and the user equipment using the determined antenna configuration parameter for the corresponding antenna, wherein the plurality of different frames whose training signals in combination are used for determining the antenna configuration parameter comprises the frame in which most recently a training signal has been received from the user equipment and at least one earlier received frame with a training signal of the user equipment.

2. The method according to claim 1,
wherein the step of determining an antenna configuration parameter comprises averaging the training signals received at the antenna in the plurality of different frames and determining the antenna configuration parameter based on a result of the averaging.

3. The method according to claim 1,
wherein the step of determining an antenna configuration parameter comprises weighting the training signals received at the corresponding antenna in the plurality of different frames with individual weighting factors to determine the antenna configuration parameter based on a combination of the training signals weighted with the weighting factors.

4. A method for operating a base station in a wireless radio network, wherein the base station comprises a plurality of antennas for transmitting information in a frame structure between the base station and a user equipment and wherein the user equipment transmits training signals to the base station,
the method comprising the steps:
  receiving at each antenna of a subset of the plurality of antennas of the base station the training signals sent by the user equipment, and
  determining an antenna configuration parameter for each antenna of the subset of the plurality of antennas based on a combination of the training signals received in a plurality of different frames at the corresponding antenna for a subsequent transmission of payload information between the base station and the user equipment using the determined antenna configuration parameter for the corresponding antenna,
wherein the step of determining an antenna configuration parameter comprises weighting the training signals received at the corresponding antenna in the plurality of different frames with individual weighting factors to determine the antenna configuration parameter based on a combination of the training signals weighted with the weighting factors, and
wherein the weighting factors are chosen such that a training signal of a most recently received frame is weighted higher than a training signal of a frame that is received earlier than the most recently received frame.

5. The method according to claim 3,
wherein the weighting factors are chosen such that a training signal is weighted higher the later the frame of this training signal is received at the corresponding antenna of the base station.

6. The method according to claim 1,
further comprising determining a movement between the base station and the user equipment,
wherein the step of determining an antenna configuration parameter for each antenna of the subset of the plurality of antennas based on the combination of the training signals received in the plurality of different frames is carried out if the movement between the base station and the user equipment exceeds a threshold value.

7. A method for operating a base station in a wireless radio network, wherein the base station comprises a plurality of antennas for transmitting information in a frame structure between the base station and a user equipment and wherein the user equipment transmits training signals to the base station,
the method comprising the steps:
  receiving at each antenna of a subset of the plurality of antennas of the base station the training signals sent by the user equipment,
  determining an antenna configuration parameter for each antenna of the subset of the plurality of antennas based on a combination of the training signals received in a plurality of different frames at the corresponding antenna for a subsequent transmission of payload information between the base station and the user equipment using the determined antenna configuration parameter for the corresponding antenna, and determining a movement between the base station and the user equipment, wherein the step of determining an antenna configuration parameter for each antenna of the subset of the plurality of antennas based on the combination of the training signals received in the plurality of different frames is carried out if the movement between the base station and the user equipment exceeds a threshold value, and wherein the step of determining an antenna configuration parameter for each antenna of the subset of the plurality of antennas based on the combination of the training signals received in the plurality of different frames is carried out if the step of determining the movement between the base station and the user equipment indicates that a user of the user equipment is stationary, but the user equipment is moving.

8. The method according to claim 1, further comprising determining a deterioration parameter indicating a deterioration of the transmission between the base station and the user equipment due to a change in the transmission requiring an adaptation of the antenna configuration parameter, and determining, based on the deterioration parameter, a timing parameter for controlling when a next time slot is to be provided for receiving at each antenna of the subset of the plurality of antenna a next training signal from the user equipment.

9. The method according to claim 8,
wherein the step of determining the deterioration parameter comprises determining a movement between the base station and the user equipment and/or determining a spatial information of the base station or of the user equipment.

10. The method according to claim 1,
wherein the wireless radio network is a MIMO communication system.

11. A base station for a wireless radio network, comprising:
a plurality of antennas for transmitting radio frequency signals in a frame structure between the base station and a user equipment, and
a processing device configured to
receive at each antenna of a subset of the plurality of antennas training signals sent by the user equipment, and
determine an antenna configuration parameter for each antenna of the subset of the plurality of antennas based on a combination of the training signals received in a plurality of different frames at the corresponding antenna for a subsequent transmission of payload information between the base station and the user equipment using the determined antenna configuration parameter for the corresponding antenna, wherein the plurality of different frames whose training signals in combination are used for determining the antenna configuration parameter comprises the frame in which most recently a training signal has been received from the user equipment and at least one earlier received frame with a training signal of the user equipment.

12. The base station according to claim 11,
wherein the base station is configured to be operated in a MIMO communication system.

13. A user equipment for a wireless radio network, wherein the user equipment is configured for transmission of radio frequency signals between the user equipment and the base station according to claim 11.

14. A base station for a wireless radio network, comprising:
a plurality of antennas for transmitting radio frequency signals in a frame structure between the base station and a user equipment, and
a processing device configured to
receive at each antenna of a subset of the plurality of antennas training signals sent by the user equipment, and
determine an antenna configuration parameter for each antenna of the subset of the plurality of antennas based on a combination of the training signals received in a plurality of different frames at the corresponding antenna for a subsequent transmission of payload information between the base station and the user equipment using the determined antenna configuration parameter for the corresponding antenna,
wherein the step of determining an antenna configuration parameter comprises weighting the training signals received at the corresponding antenna in the plurality of different frames with individual weighting factors to determine the antenna configuration parameter based on a combination of the training signals weighted with the weighting factors, and
wherein the weighting factors are chosen such that a training signal of a most recently received frame is weighted higher than a training signal of a frame that is received earlier than the most recently received frame.

15. A base station for a wireless radio network, comprising:
a plurality of antennas for transmitting radio frequency signals in a frame structure between the base station and a user equipment, and
a processing device configured to
receive at each antenna of a subset of the plurality of antennas training signals sent by the user equipment,
determine an antenna configuration parameter for each antenna of the subset of the plurality of antennas based on a combination of the training signals received in a plurality of different frames at the corresponding antenna for a subsequent transmission of payload information between the base station and the user equipment using the determined antenna configuration parameter for the corresponding antenna, and
determine a movement between the base station and the user equipment,
wherein the step of determining an antenna configuration parameter for each antenna of the subset of the plurality of antennas based on the combination of the training signals received in the plurality of different frames is carried out if the movement between the base station and the user equipment exceeds a threshold value, and
wherein the step of determining an antenna configuration parameter for each antenna of the subset of the plurality of antennas based on the combination of the training signals received in the plurality of different frames is carried out if the step of determining the movement between the base station and the user equipment indicates that a user of the user equipment is stationary, but the user equipment is moving.

* * * * *